(12) United States Patent
Parker, Jr.

(10) Patent No.: US 6,543,192 B1
(45) Date of Patent: Apr. 8, 2003

(54) LINTEL SUPPORT BRACE AND METHOD OF USING SAME

(76) Inventor: Homer W. Parker, Jr., 1601 Woodrock Dr., Round Rock, TX (US) 78681

( * ) Notice: Subject to any disclaimer, the term of this patent is extended or adjusted under 35 U.S.C. 154(b) by 0 days.

(21) Appl. No.: 09/864,792

(22) Filed: May 24, 2001

Related U.S. Application Data

(60) Provisional application No. 60/206,884, filed on May 24, 2000.

(51) Int. Cl.[7] .............................. E04C 3/02; E04C 5/08; F16L 3/08; A47F 5/00; F16B 1/00
(52) U.S. Cl. ................ 52/204.2; 52/223.1; 52/223.8; 52/223.13; 248/74.4; 248/208; 403/337; 403/338
(58) Field of Search .............................. 52/204.2, 223.1, 52/223.8, 223.13; 248/74.4, 208; 403/337, 338; 269/904, 221

(56) References Cited

U.S. PATENT DOCUMENTS

| | | | | |
|---|---|---|---|---|
| 1,940,278 A | * | 12/1933 | Walker |
| 2,724,201 A | * | 11/1955 | Cavalero |
| 2,923,995 A | * | 2/1960 | Homma |
| 4,020,612 A | * | 5/1977 | Welch |
| 4,106,247 A | * | 8/1978 | Svensson |
| 4,681,290 A | * | 7/1987 | Crosbie |
| 5,617,963 A | * | 4/1997 | Baziuk |
| 5,673,883 A | * | 10/1997 | Figueroa |

* cited by examiner

*Primary Examiner*—Carl D. Friedman
*Assistant Examiner*—Kevin McDermott
(74) *Attorney, Agent, or Firm*—James E. Walton; Hill & Hunn, LLP

(57) ABSTRACT

A lintel support brace having a top portion, an opposing bottom portion adjustably coupled to the top portion, and a support arm coupled to the bottom portion, wherein the top portion and the bottom portion are configured to be attached to an adjoining header.

10 Claims, 1 Drawing Sheet

LINTEL SUPPORT BRACE AND METHOD OF USING SAME

This application claims the benefit of U.S. Provisional Application No. 60/206,884, filed May 24, 2000, titled "Lintel Support Brace and Method of Using Same."

BACKGROUND ART

1. Field of the Invention

The present invention relates to lintels used in the construction industry to support masonry units. In particular, the present invention relates to repair of deflected lintels and installation of lintels that resist deflection.

2. Description of Related Art

Lintels support masonry over a door or window. They are typically made from 4"×4"×3/8" angle iron, and can be up to twenty feet or more in length. Normally, each lintel is supported only by stands of masonry on either end of the lintel. However, with the rapid increase in construction in the United States, it has become the practice of some contractors to install 4"×4"×1/4" or similar smaller-size masonry lintels with lag screws to adjoining headers, also referred to as beams or girders, over doors and windows. This practice may include supporting the lintel with posts during installation and while the masonry dries. When used in this fashion, the lintel and the lag bolts are subjected to fatigue stress and strain from thermal expansion due to temperature changes and the load of the carried masonry. Over time, the lintel deflects, or sags, and rotates, resulting in damage to the supporting veneer and an unsafe positioning of the masonry load, which must be repaired. These repairs are time consuming, labor intensive, and costly. These repairs can take up to three days to complete.

Common methods for repairing damaged lintels include: (a) having the owner continuously repair the masonry by pointing; or (b) removing the masonry and the damaged lintel, replacing the damaged lintel with a stiffer lintel, and replacing the masonry. Removal of the masonry usually results in irreparable damage to some or all of the masonry, such that the removed masonry must be replaced with new masonry. In such cases, the owner usually finds that it is very difficult to match the old masonry. Further, the irreparable masonry must be discarded in land fills, which adds additional cost to the repair project.

Typically, a failed lintel, or a lintel of inadequate strength, sags or deflects downward at the mid-section. Also, the exterior edge of the lintel may also rotate in a direction downward and away from the header. The 1997 Uniform Building Code, and the proposed International Building Code 2000, indicate that the limit of deflection for masonry is limited to L/600 or 3/8", whichever is more critical.

BRIEF SUMMARY OF THE INVENTION

There is a need for a lintel support brace for use in repairing damaged or sagging lintels, or that can be used as part of an original lintel installation.

It is an object of the present invention to provide a lintel support brace that can be used to repair damaged or sagging lintels and that can also be used as part of an original lintel installation.

It is another object of the present invention to provide a method of installing or repairing a lintel by providing a lintel support brace that transfers some or all of the load of the carried masonry to the header.

The above objects are achieved by providing a lintel support brace having a top portion, an opposing bottom portion adjustably coupled to the top portion, and a support arm coupled to the bottom portion, wherein the top portion and the bottom portion are configured to be attached to an adjoining header.

The present invention has significant advantages, including: (1) the removal and disposal of damaged masonry is not necessary, thereby preserving the aesthetic nature of the masonry and avoiding the time and expense associated with matching new masonry to the old masonry; (2) structural support for existing lintels is increased, thereby increasing the factor of safety against recurring damage; (3) the time and expense of repair projects is greatly reduced, for example, from 3 days to one half of one day; (4) the level of expertise required to perform the repair project is reduced, such that homeowners equipped with basic tools can perform the repair project; and (5) the present invention allows for normal thermal expansion of the masonry lintel, thereby preventing fatigue failure and residual stress due to boundary restraint conditions. In addition, by installing a plurality of lintel support braces according to the present invention, the span of the deflected beam is reduced and deflection is improved significantly. The placement of two lintel support braces reduces deflection significantly under the same loading conditions. Furthermore, the lintel support brace provides an additional factor of safety in deflection, provided the header has sufficient capacity to support the additional loading.

These objects and advantages, as well as others, will be evident from the following detailed description of the present invention.

DETAILED DESCRIPTION OF THE PREFERRED EMBODIMENT

Figure 1:
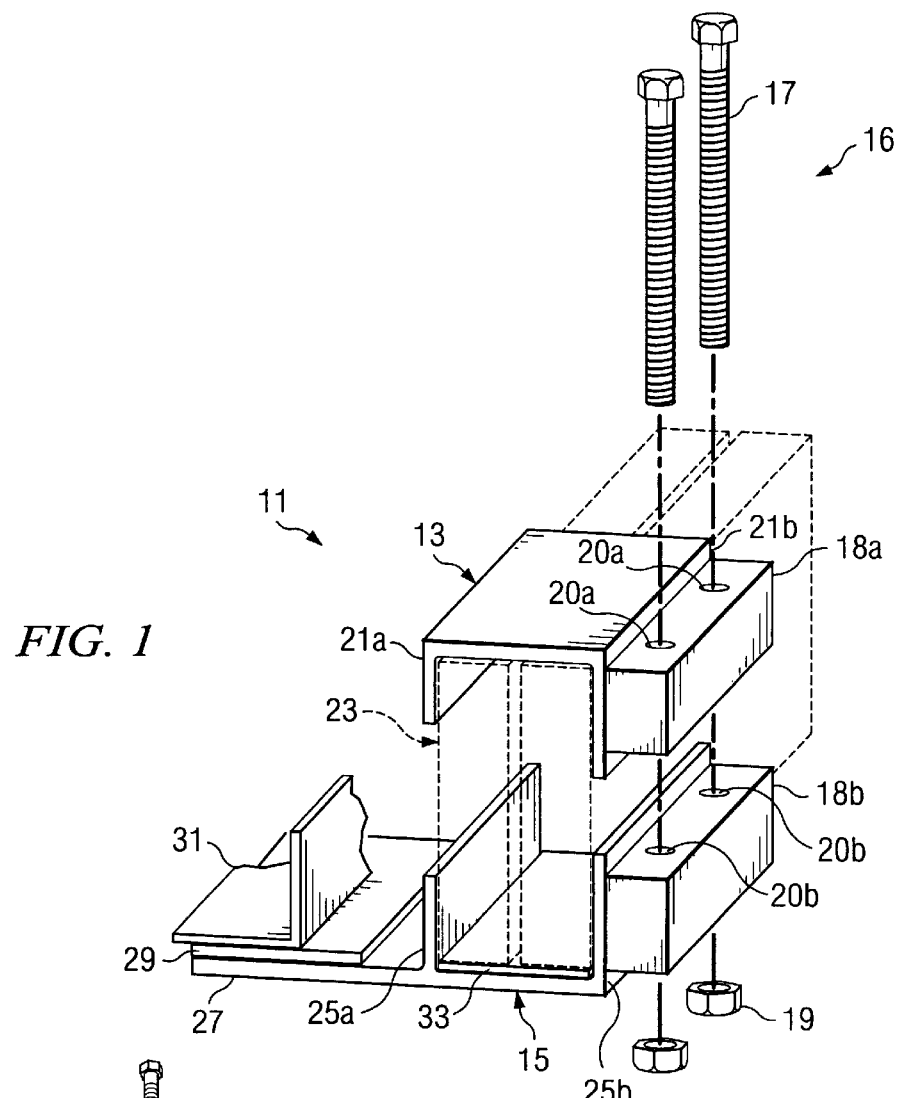
FIG. 1 is a perspective view of the lintel support brace according to the present invention.

Referring to FIG. 1 in the drawings, the preferred embodiment of a lintel support brace 11 according to the present invention is illustrated. Lintel support brace 11 includes a top portion 13 and a bottom portion 15 that is adjustably coupled to top portion 13. Top portion 13 and bottom portion 15 are adjustably coupled by at least one adjusting means 16, preferably a bolt 17 and a nut 19. Adjusting means 16 may also be a lever arrangement, dial, or any other conventional device for adjustably bringing top portion 13 and bottom portion 15 together in a generally vertical fashion.

Top portion 13 is preferably channel shaped and includes parallel tabs 21a and 21b. Top portion 13 is preferably made from 3/8" channel iron. Tabs 21a and 21b extend downwardly and are spaced to fit on either side of a conventional header 23. Header 23 is typically made from two 2"×12" pieces of lumber, but lintel brace 11 may be used with headers of different types of material and construction. Bottom portion 15 is also preferably channel shaped and includes two parallel tabs 25a and 25b. Bottom portion 15 is preferably made from 3/8" channel iron. Tabs 25a and 25b extend upwardly and are spaced to fit on either side of header 23. Thus, tabs 21a and 21b of top portion 13 and tabs 25a and 25b of bottom portion 15 are aligned when lintel support brace 11 is assembled. Bottom portion 15 includes a support arm 27 that extends perpendicularly outward from tab 25a and header 23 to support a lintel 31.

A guide block 18a is coupled to top portion 13, and a similar guide block 18b is coupled to bottom portion 15. Guide members 18a and 18b facilitate the alignment of top portion 13 and bottom portion 15, and may facilitate in the adjustment of adjusting means 16. In the preferred embodiment, top portion 13 and bottom portion 15 are aligned by passing bolts 17 through apertures 20a in guide member 18a and apertures 20b in guide member 18b.

In a repair or preventative maintenance application, lintel 31 is an existing lintel. In a new installation application, lintel 31 is adapted to be supported by lintel support brace 11 and header 23. In the preferred embodiment, support arm 27 carries a shim 29 disposed between support arm 27 and lintel 31. Shim 29 is preferably secured to support arm 27, but not to lintel 31 to ensure that lintel 31 is able to "float" as needed due to thermal expansion and contraction. Proper floating of the lintel is undermined by bolting the lintel to the header, as is being done in the industry today.

Use of the present invention on an existing lintel, either to repair a damaged or sagging lintel, or as preventative maintenance, will now be discussed. The first step in the installation process of the present invention is to remove all or part of any existing door frame and molding (not shown) to expose either all or small sections of the top and bottom of header 23. Adjusting means 16 is then adjusted such that top portion 13 and bottom portion 15 may be separated from each other enough to allow clearance of tabs 21a, 21b, 25a, and 25b over and under header 23. In the preferred embodiment, this is done by loosening bolt 17 and nut 19. Top portion 13 is fitted over header 23, such that tabs 21a and 21b are on either side of header 23. Bottom portion 15 is fitted onto the bottom of header 23, such that tabs 25a and 25b are on either side of header 23. Lintel support brace 11 is installed such that support arm 27 extends out from header and beneath existing lintel 31. It may be necessary to dispose a second shim 33 between bottom portion 15 and header 23 to obtain the necessary vertical alignment of support arm 27 relative to existing lintel 31.

Once top portion 13 and bottom portion 15 are aligned over and under header 23, adjusting means 16 is adjusted such that header 23 is compressed between top portion 13 and bottom portion 15. In the preferred embodiment, this is done by tightening bolts 17 and nuts 19. In this manner, the load of lintel 31 will be transferred to header 23 in torque via lintel support brace 11. A plurality of lintel support braces 11, in an appropriate spaced relation, may be installed to support a single existing lintel 31.

Lintel support brace 11 will securely clamp to headers 23 of varying configurations. For example, header 23 may be of beam-composite, beam-glue laminated, or truss construction. When bolt 17 and nut 19 are tightened, damaged, sagging, or rotated lintels are raised and rotated back into a proper position. It should be understood that the installer may shore and lift the existing lintel with separate conventional means (not shown) to reduce the required torque force on adjusting means 16, and uniformly torque each lintel support brace 11. By using the method described above, existing lintel 31 may be repaired or the vertical position of existing lintel 31 may be raised or maintained without removing or destroying any of the existing masonry. The above procedure does not require any particular expertise. The average homeowner can perform the project with only basic tools.

In a new construction application, the above procedure is performed prior to installation of the masonry and any door frame or molding. Lintel support brace 11 is installed in the same manner described above. In this manner, lintel support braces 11 can be used to provide supplemental support in cases where properly sized lintels are not commercially available, or where geometrical shapes and transitions need additional support to limit deflection.

Figure 2:
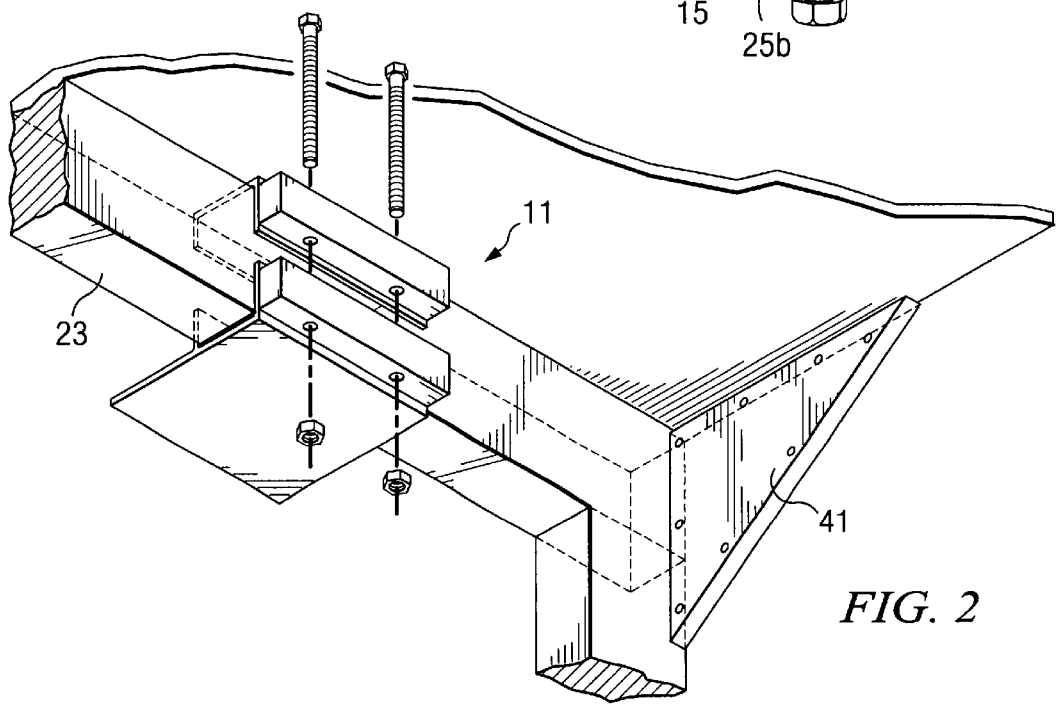
FIG. 2 is a perspective view of the lintel support brace according to the present invention shown with an additional support member.

Lintel support brace 11 may include an epoxy coating to prevent damage to header 23 or other components. In addition, it should be understood that if the masonry load carried by lintel support braces 31 and header 23 are excessive, it may be necessary to provide additional support members 41 (see FIG. 2) at the ends of header 23 to prevent undesirable rotation of header 23. For example, triangular sheets of plywood attached to the interior side walls of a garage and strapped to header 23 will provide sufficient support to prevent header 23 from rotating outward under the masonry load.

A further benefit is that this methodology allows for the normal thermal expansion of the masonry lintel, thus preventing residual stress due to boundary restraint conditions.

Experimental tests have been performed on a sample lintel support brace 31. These tests indicate that lintel support braces 31 can support the typical full load capacity of header 23 without deflection or bending. The tests indicated that two lintel support braces can carry up to about 9,000 pounds before the header failed in torsion. The dimensions of lintel support brace 31 may be increased depending upon the application in which lintel support brace 31 is used. It should be understood that increasing the dimensions of lintel support brace 31 will result in an increase in the loads in which lintel support brace 31 may carry before failure. Because there is a possibility of conflict with hardware associated with overhead garage doors and openers, it is preferred that an even number of evenly spaced lintel support braces are most effective in supporting the masonry loads.

Although the present invention is shown in a limited number of forms, it is not limited to just these forms, but is amenable to various changes and modifications without departing from the spirit thereof.

I claim:

1. An apparatus for supporting a lintel, the apparatus comprising:

a top portion;

a bottom portion adjustably coupled to the top portion; and a lintel support arm extending outward from the bottom portion for supporting the lintel;

a shim carried by the lintel support arm, the shim being disposed between the lintel support arm and the lintel;

wherein the top portion and the bottom portion are configured for attachment to a header.

2. An apparatus for supporting a lintel, the apparatus comprising:

a top portion;

a bottom portion adjustably coupled to the top portion; and a lintel support arm extending outward from the bottom portion for supporting the lintel;

a shim disposed between the bottom portion and the header for adjusting the location of the lintel support arm relative to the header;

wherein the top portion and the bottom portion are configured for attachment to a header.

3. An apparatus for supporting a lintel, the apparatus comprising:

a top portion;

a bottom portion adjustably coupled to the top portion; and a lintel support arm extending outward from the bottom portion for supporting the lintel;

a means for reducing movement of the header;

wherein the top portion and the bottom portion are configured for attachment to a header.

4. The apparatus according to claim 3, wherein the means for reducing movement of the header comprises:

at least one plate coupled to the header and to an adjacent structure.

5. A method of supporting a lintel with a header, the method comprising the steps of:

providing a top portion;

providing a bottom portion having a lintel support arm;

adjustably coupling the bottom portion to the top portion;

disposing the top portion over the header;

disposing the bottom under the header;

adjusting the coupling of the top portion to the bottom portion such that the header is disposed between the top portion and the bottom portion; and supporting the lintel with the lintel support arm.

6. The method according to claim 5, further comprising the step of:

disposing a shim between the lintel support arm and the lintel.

7. The method according to claim 5, further comprising the step of:

disposing a shim between the header and the bottom portion.

8. The method according to claim 5, further comprising the steps of:

providing an adjusting means for adjusting the top portion relative to the bottom portion adjusting the top portion relative to the bottom portion such that the header is compressed between the top portion and the bottom portion.

9. The method according to claim 5, wherein the step of providing an adjusting means comprises the steps of:

providing at least one bolt for passage through both the top portion and the bottom portion; and providing an adjustment nut configured to matingly couple with the at least one bolt; and wherein the step of adjusting the top portion relative to the bottom portion comprises the steps of:

passing the at least one bolt through both the top portion and the bottom portion; and tightening the adjustment nut such that the header is compressed between the top portion and the bottom portion.

10. The method according to claim 5, further comprising the steps of:

providing a header support plate;

coupling the header support plate to the header and to an adjacent structure to reduce movement of the header.

* * * * *